United States Patent
Rieder et al.

(10) Patent No.: US 8,385,421 B2
(45) Date of Patent: Feb. 26, 2013

(54) METHOD FOR ESTIMATING THE MOTION IN IMAGE PROCESSING

(75) Inventors: Peter Rieder, Munich (DE); Guenter Scheffler, Munich (DE); Christian Tuschen, Munich (DE); Marko Hahn, Neubiberg (DE); Markus Schu, Erding (DE)

(73) Assignee: Entropic Communications, Inc., San Diego, CA (US)

( * ) Notice: Subject to any disclaimer, the term of this patent is extended or adjusted under 35 U.S.C. 154(b) by 1160 days.

(21) Appl. No.: 12/258,178

(22) Filed: Oct. 24, 2008

(65) Prior Publication Data

US 2009/0115851 A1 May 7, 2009

(30) Foreign Application Priority Data

Oct. 25, 2007 (DE) .......... 10 2007 051 174

(51) Int. Cl.
- H04B 1/66 (2006.01)
- H04N 7/12 (2006.01)
- H04N 11/02 (2006.01)
- H04N 11/04 (2006.01)

(52) U.S. Cl. .................. 375/240.16
(58) Field of Classification Search .......... 348/700
See application file for complete search history.

(56) References Cited

U.S. PATENT DOCUMENTS

| | | | |
|---|---|---|---|
| 4,853,775 A | 8/1989 | Rouvrais et al. | |
| 5,072,293 A | 12/1991 | De Haan et al. | |
| 6,782,054 B2 * | 8/2004 | Bellers | 375/240.27 |
| 2003/0189980 A1 | 10/2003 | Dvir et al. | |
| 2004/0190624 A1 | 9/2004 | Kondo et al. | |
| 2005/0286636 A1 | 12/2005 | Nicolas | |
| 2007/0098279 A1 * | 5/2007 | Hahn et al. | 382/238 |

FOREIGN PATENT DOCUMENTS

| | | |
|---|---|---|
| EP | 0415491 | 4/1996 |
| WO | 02087210 | 10/2002 |
| WO | 2004111939 | 9/2005 |

OTHER PUBLICATIONS

Yeo et al.; "A Cost Function With Position Penalty for Motion Estimation in MPEG-2 Video Coding"; IBM, T.J. Watson Research Center, Yorktown Heights, NY, 10548 (2002).*

Yeo et al; "A Cost Function With Position Penalty for Motion Estimation in MPEG-2 Video Coding"; IBM, T.J. Watson Research Center, Yorktown Heights, NY, 10548 (2002).

Schroder et al; "Mehrdimensionale Signalverarbeitung;" vol. 2; ISBN 3-519-06197-X, pp. 259-266 (2000) (Concise Explanation of relevance incorporated in Applicant's Specification on pp. 1 and 2.).

(Continued)

*Primary Examiner* — Mehrdad Dastouri
*Assistant Examiner* — Kristin Dobbs
(74) *Attorney, Agent, or Firm* — Bruce Greenhaus; Duane Morris LLP

(57) ABSTRACT

A method of selecting a motion vector for an image block of an image of an image sequence from a number of test vectors.

12 Claims, 3 Drawing Sheets

OTHER PUBLICATIONS

Office Action issued by the German Patent Office in Corresponding German Application No. 10 2007 051 174.6-55 (Sep. 10, 2008).

Related U.S. Appl. No. 12/258,142, filed Oct. 24, 2008.

Office Action issued by the German Patent Office in German Application No. 10 2007 051 175.4-55 (Sep. 10, 2008) corresponding to related to U.S. Appl. No. 12/258,142.

European Search Report issued in connection with corresponding European Patent Application No. 08018113.4-2223, (Mar. 2, 2009).

European Search Report issued in connection with European Application No. 08018112.6-2223 corresponding to related U.S. Appl. No. 12/258,142, (Mar. 2, 2009).

* cited by examiner

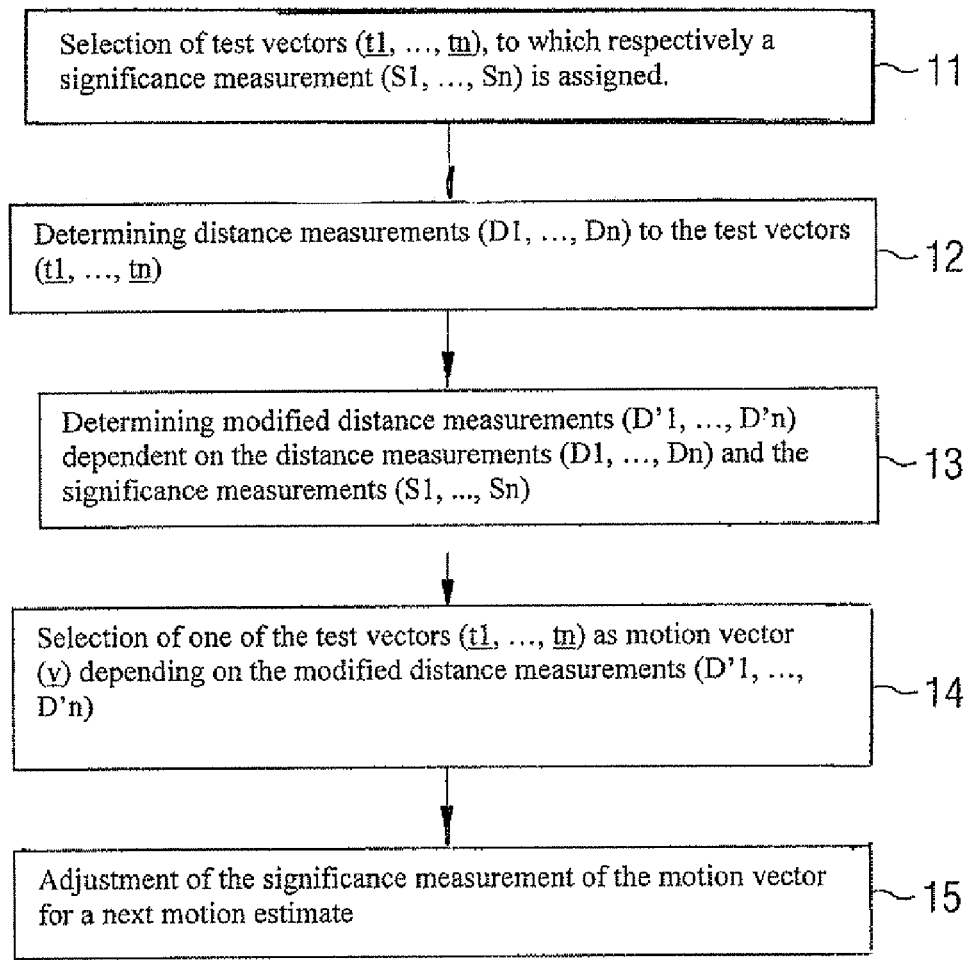
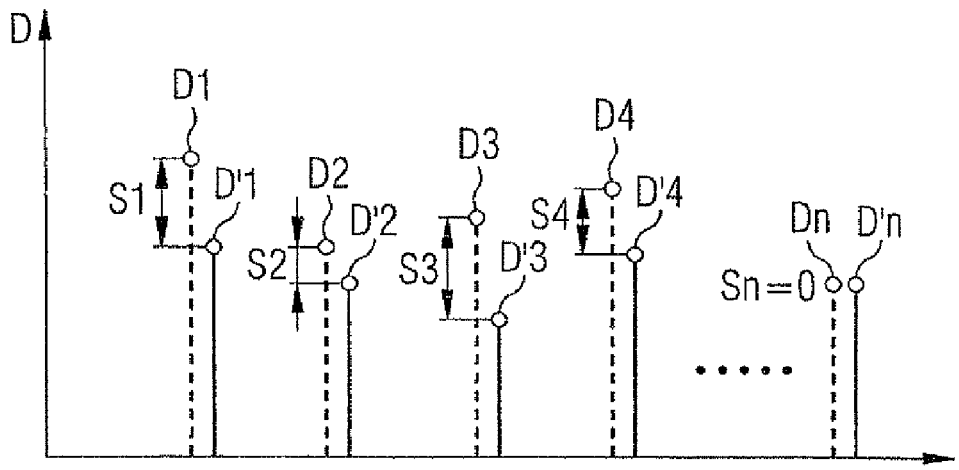

METHOD FOR ESTIMATING THE MOTION IN IMAGE PROCESSING

The invention relates to a method for estimating motion, more precisely, a method for selecting a motion vector assigned to an image area from a number of test (motion) vectors.

In image processing it is known to subdivide successive images of an image sequence into image areas or image blocks and to respectively determine a motion vector to each of these image blocks. A motion vector assigned to an image block hereby contains information on a spatial displacement of the image content of the respective block from a current image to a temporally preceding or a temporally successive image.

Motion information of this type represented by a motion vector can be used, for example, in predictive coding methods such as MPEG-2 or H263, which are used for data compression. Instead of coding an image block of the same content, which is found in successive images, for each image, with this method the image content is coded only once and additionally the motion information. The original image sequence can be reconstructed again from these image data coded once and the additionally coded motion data.

The motion information represented by a motion vector can, moreover, be generated for the interpolation of one or more intermediate images, which are arranged temporally between original images of an image sequence. The motion information is used hereby in order to represent moving objects in the correct motion in the intermediate images, i.e., in order to represent the object at a position in the intermediate image, which position lies between the positions of the object in the original images.

A possible method for determining motion vectors of this type is the so-called block-matching method that is described, e.g., in Schröder, H.; Blume, H.: "Mehrdimensionale Signalverarbeitung," Vol. 2, ISBN 3-519-06197-X, pages 259-266. In this method the current image of an image sequence is subdivided into a number of blocks of the same size. For each of these blocks the block is then sought in the previous or subsequent image, the image content of which block has the greatest coincidence with the content of the respective block of the current image. The displacement vector between this block of the current image and the block of the previous or subsequent image that has the greatest coincidence with this block of the current image then forms the motion vector to this block of the current image.

With the so-called full search algorithm, each block of the current image is hereby compared to each block of the previous or subsequent image in order to determine the motion vectors of the individual areas. To reduce the substantial computational complexity that is necessary with the full search algorithm, furthermore predictive estimating methods are known in which, for the determination of the motion vector to a block, motion information is taken into account that has been determined for image blocks that are temporally and/or spatially adjacent to a considered image block. The motion vectors determined for temporally and/or spatially adjacent image blocks of this type hereby form so-called test vectors for determining a motion vector to a considered image block. From these test vectors the motion vector is then selected using a block-matching method.

Predictive estimation methods of this type are described, for example, in U.S. Pat. No. 4,853,775 (Rouvrais), U.S. Pat. No. 5,072,293 (de Haan) or U.S. Pat. No. 6,782,054 B2 (Bellers).

Often the comparison results obtained through the block matching method to the individual test vectors are not unambiguous, i.e., the same or approximately the same results are obtained for two or more test vectors, so that the selection of the "correct" vector is no longer possible with great certainty. Identical comparison results of this type occur, for example, with large-area unmoving or slowly moving objects extending over several blocks.

The object of the present invention is to provide an improved method for selecting a motion vector from a number of test vectors. This object is attained with a method according to claim 1. Embodiments and further developments of the invention are the subject matter of subordinate claims.

One exemplary embodiment of the invention relates to a method for selecting a motion vector for a first image block of an image of an image sequence from a number of test vectors, wherein at least one of these test vectors is a motion vector of another image block that is arranged temporally and/or spatially adjacent to the first image block, or is a vector formed by modification of this motion vector. In this method it is provided: determining a distance measurement for each test vector; determining a vector length of the test vectors and determining the test vector with the shortest vector length or a first subgroup of test vectors with the shortest vector lengths compared to the other test vectors; determining a modified distance measurement to the shortest test vector or to the test vectors of the subgroup dependent on the distance measurement determined to the respective test vector and dependent on a length measurement; and comparing the modified distance measurement of the shortest motion vector or the modified distance measurements of the test vectors of the first subgroup to the distance measurements of the other test vectors and selecting one of the test vectors depending on this comparison.

In an exemplary embodiment it is thereby provided that the length measurement is firmly predetermined. In a further example it is provided that the modified length measurement corresponds to a difference between the distance measurement and the length measurement.

Furthermore, there is the possibility of taking the length measurement into account only with every nth, where n≧2, determination of a motion vector for the first image block.

In a further example of the method it is provided that a significance measurement is respectively assigned to the test vectors. In this method it is further provided: determining the modified distance measurement of the shortest test vector or the first subgroup depending on the significance measurement assigned to this test vector or on the significance measurements assigned to theses test vectors and determining modified distance measurements for the other test vectors, which are dependent on the significance measurements respectively assigned to these test vectors; selecting one of the test vectors as a motion vector depending on the modified distance measurements; determining a new significance measurement of the test vector selected as motion vector depending on whether the selected motion vector meets at least one significance criterion, and assigning this new significance measurement as significance measurement to the motion vector for the selection of a motion vector for a third image block, in which the motion vector of the first image block or a vector formed by modification of this motion vector is selected as test vector.

In this method the modified distance measurement to a motion vector is formed, for example, by subtraction of the significance measurement from the distance measurement. For example, the test vector for which for the smallest modified distance measurement was determined is selected as motion vector. The determination of the distance measurement is carried out, for example, using a "block-matching" method in which the image contents of the image blocks that lie at the starting point and the end point of the test vector, are compared pixel by pixel. A test vector with a "high" significance measurement is hereby rewarded compared to test vectors with a lower significance measurement.

The selected motion vector, for example, meets a first significance criterion and is then considered significant, when the distance measurement determined for the selected test vector is greater than a predetermined first threshold value. This first threshold value is thereby selected, for example, such that it is greater than a distance measurement that was obtained with two blocks with identical image contents based on an unavoidable noise.

For example, the selected motion vector can also be considered significant and thus meet a second significance criterion when the distance measurement of the selected vector is smaller than the threshold value, but at least one test vector is present, the distance measurement of which is greater than the threshold value. A distance measurement that is smaller than the threshold value can be present, for example, when the image block lies within a homogenous image area and the selected test vector does not display beyond this homogeneous area. The presence of a vector, the distance measurement of which is greater than the threshold value, shows that a vector is present that displays beyond the homogenous area, so that overall a significant image environment can be assumed in the area of the image block, with the result that a vector the distance measurement of which is smaller than the threshold value can also be significant. A distance measurement that is smaller than the threshold value can also be present, for example, when the best motion vector lies in a structured environment and exactly reflects the motion of the associated image block, that is, when the motion vector "matches" exactly. A large distance measurement for another (wrong or not matching) motion vector indicates in this case that a significant image environment is present.

Another significance criterion is met for a selected test vector, for example, when a difference between the largest of the distance measurements determined for the test vectors and the smallest of the distance measurements determined for the test vectors is greater than a predetermined second threshold value.

With one example it is provided to set the significance measurement of the test vector selected as motion vector at a predetermined value when the selected test vector meets at least one significance criterion, and to determine the new significance measurement by reducing the significance measurement hitherto assigned to the selected test vector when the selected test vector does not meet a significance criterion. The significance of a test vector that is selected again in a subsequent selection process for another image block without being significant again, is thereby gradually reduced. Alternatively to setting the significance measurement to a predetermined value with existing significance of the selected test vector, there is the possibility with given significance of the selected test vector of increasing its significance measurement by a predetermined value in order to obtain the new significance measurement.

Optionally there is the possibility of incorporating the origin of the test vectors into the determination of the modified distance measurement. There is thus, for example, the possibility of "rewarding" test vectors of this type that directly represent a motion vector of a temporally or spatially adjacent image block. To this end, for test vectors of this type in the determination of the modified distance value, for example, a bonus value is subtracted from the determined distance value, or for test vectors that represent a modified motion vector, a penalty value is added to the calculated distance measurement.

Exemplary embodiments of the present invention are explained in more detail below based on figures. The figures show only the features necessary for understanding the present invention. Identical reference numbers thereby refer to identical parts and process steps with the same meaning.

FIG. 2 illustrates process steps of an exemplary embodiment of a method according to the invention based on a flow chart.

FIG. 3 shows by way of example distance measurements, significance measurements and modified distance measurements for test vectors in a diagram.

Figure 1:
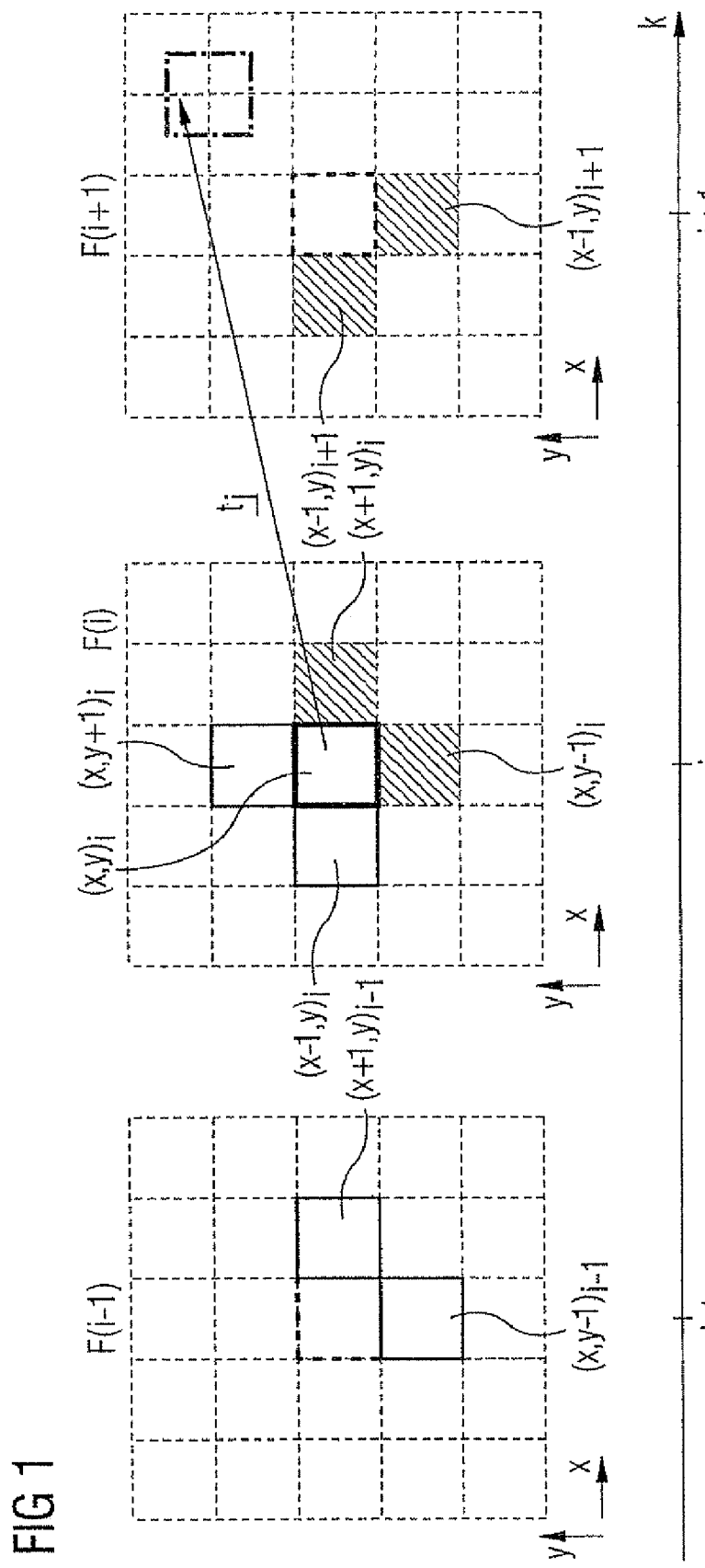
FIG. 1 shows diagrammatically a temporal section of an image sequence that has several successive images with respectively a number of image blocks.

FIG. 1 shows diagrammatically a temporal section of an image sequence that has several temporally successive images $F(i-1)$, $F(i)$, $F(i+1)$. k thereby denotes a discrete time variable. $i-1$, i and $i+1$ are points in time at which the individual images $F(i-1)$, $F(i)$, $F(i+1)$ are present. The individual images that are shown only in sections in FIG. 1 comprise a number of image blocks with respectively several picture elements (not shown). The individual image blocks comprise, for example, 8×8 or 16×16 picture elements. At least one image information value is hereby assigned to the individual picture elements. Thus, for example, three color intensity values (RGB values) for the primary colors red, green and blue or a luminance value (Y value) and two chrominance values (UV values) are assigned to the individual picture elements. The image information values assigned to the individual picture elements can change from image to image, whereby a moving image representation is possible.

For the following explanation it is assumed that the individual image blocks of an image are arranged in a raster-like manner. The nomenclature $(a, b)_c$ is used below to denote an image block located at a certain position in a certain image, wherein a is the horizontal position of the image block within the raster, b is the vertical position of the image block within the raster and c is the temporal position of the respective image from which the image block originates.

Motion vectors, which are also called displacement vectors, are to be determined for the individual image blocks. A motion vector assigned to an image block thereby contains information on a spatial displacement of an image content represented by the respective image block from image to image. For the following explanation an image block $(x, y)_i$ within the image $F(i)$ is considered, which is represented in bold type in FIG. 1. A method for determining a motion vector for this image block $(x, y)_i$ is explained below based on the flow chart in FIG. 2 in conjunction with FIG. 1. $v(a, b)_c$ denotes below in general a motion vector assigned to an image block $v(a, b)_c$.

For purposes of the explanation it is assumed that respectively five test vectors are selected, for which, for example, the following applies:

$$t1=0 \tag{1a}$$

$$t2=v(x,y+1)_i \tag{1b}$$

$$t3=v(x-1,y)_i \tag{1c}$$

$$t4 = v(x, y-1)_{i-1} \quad (1d)$$

$$t5 = v(x+1, y)_{i-1} \quad (1e).$$

A first test vector t1 is hereby the zero vector. A second vector t2 is the motion vector for an image block $(x, y+1)_i$, which lies within the same image F(i) directly above the considered image block $(x, y)_i$, a third test vector t3 is a motion vector for an image block $(x-1, y)_i$, that is arranged in the image F(i) to the left adjacent to the considered image block $(x, y)_i$. These two image blocks $(x, y+1)_i$ and $(x-1, y)_i$ are thereby spatial neighbors of the image block $(x, y)i$. A fourth test vector t4 is the motion vector for an image block $(x, y-1)_{i-1}$, which is located in a temporally preceding image F(i-1) under the position $(x, y)$ of the considered image block $(x, y)_i$. A fifth motion vector t5 is in the example the motion vector of an image block $(x+1, y)_{i-1}$ that is located in the temporally preceding image F(i-1) to the right next to the position of the considered image block $(x, y)_i$. These two image blocks $(x, y-1)_{i-1}$ and $(x+1, y)_{i-1}$ are hereby spatial and temporal neighbors of the image block $(x, y)_i$.

It should be noted that this selection of the text vectors should be understood only as an example and serves for further explanation of the method. Of course, there is the possibility of selecting more than five test vectors and of selecting the positions of the temporally and/or spatially adjacent image blocks, the motion vectors of which are selected as test vectors, differently from in FIG. 1. For example, the motion vector of an image block $(x, y)_{i-1}$ could also be selected as a test vector, that is, the motion vector of the image block that is arranged only temporally adjacent to the considered image block $(x, y)_i$.

Moreover, test vectors can be formed by modification of the motion vectors determined for temporally and/or spatially adjacent image blocks, in that a modification vector is added to a motion vector of this type. For a test vector determined in this manner, the following, for example, applies:

$$t = v(x+u, y+v)_{i-w} + m \quad (2).$$

t thereby denotes a test vector formed by modification of a motion vector, $v(x+u, y+v)_{i-w}$ denotes a spatially and/or temporally adjacent image block to the image block $(x, y)_i$, wherein w=0 or w=1, for example, applies for w. m denotes the modification vector. Equation (2) can be considered as general regulation for selection of such test vectors that are not the zero vector. For the test vectors given in the equations (1b) through (1e), the modification vector m is thereby the zero vector. The modification vector is selected, for example, such that it can be different from image block to image block, but that it is always the same for image blocks that are located at the same position within the successive images.

In each case a significance measurement is assigned to the individual test vectors. These significance measurements assigned to the test vectors t1, t2, . . . , tn are denoted below as S1, S2, . . . , Sn. For the further explanation it is first of all assumed that these significance measurements are given to the individual test vectors. The determination of these significance measurements to the individual test vectors will be explained later.

With respect to FIG. 2, it is provided in a further process step 12 to determine distance measurements D1, . . . , Dn to the individual test vectors t1, . . . , tn. The determination of a distance measurement of this type to a test vector is fundamentally known, but is briefly explained below. To determine a distance measurement of this type, image contents of the image blocks are compared, which are located at positions predetermined by the test vector. By way of example, in this context the text vector tj represented in FIG. 1 and representing any of the test vectors, shall be considered This test vector stands for a displacement of the image content of the image block $(x, y)_i$ from the position $(x, y)$ in the image F(i) to a position $(x+\Delta x, y+\Delta y)$ in the temporally following image F(i+1). $\Delta x$ and $\Delta y$ thereby denote arbitrary displacements with respect to the position $(x, y)$ of the image block $(x, y)_i$ in the image F(i). The coordinates of the motion vectors determined for the image blocks and thus the coordinates of the test vectors—as is shown in FIG. 1 for the image block $(x+\Delta x, y+\Delta y)$—are not bound to the raster of the image blocks. The motion vectors or test vectors can rather show blocks at arbitrary positions within the image block raster.

To determine a distance measurement to the test vector tj, for example, differences of the image information values of those picture elements are determined that are located within the image blocks $(x, y)_i$ and $(x+\Delta x, y+\Delta y)_{i+1}$ at the same positions and the amounts or whole-number powers of these individual picture elements differences are added in order to obtain the distance measurement. The distance measurement obtained by adding the amounts of the picture element differences is also known as distance according to the 1 norm, while the sum of the squares of the picture element differences denotes the distance according to the so-called 2-norm. If several image information values are assigned to one picture element—as previously explained, for example, one of these image information values, for example, the Y value with a YUV representation, can be used for determining the distance measurement. Moreover, there is the possibility of determining distance measurements for one each of these image information values and of then adding these individual distance measurements.

In general, the distance measurement represents a measurement for a difference between the image contents of the image blocks assigned to the test vector, wherein the distance measurement is greater, the more picture elements are present, the image information values of which differ or the more the image information values of individual picture elements of the image blocks considered differ. If the image blocks assigned to a first test vector differ more from one another than the image blocks assigned to a second test vector, a greater distance measurement is present for the first test vector than for the second test vector. "Greater" and "smaller" do not necessarily refer thereby to the distance numerical values representing these distance measurements. Thus, for example, the difference between a constant numerical value and the sum of the amounts of the picture element differences could also be used as a distance measurement.

In a next process step 13 it is provided using the distance measurements D1, . . . , Dn determined for the individual test vectors t1, . . . , tn and using the significance measurements S1, . . . Sn assigned to the individual test vectors to determine modified distance measurements D'1, . . . D'n. For the modified distance measurement D'j of a test vector tj, for example, the following applies:

$$D'j = Dj - Sj \quad (3),$$

wherein Dj is the distance measurement determined for the test vector tj and Sj is the significance measurement assigned to this test vector. The modified distance measurement D'j is thereby smaller, the smaller the previously determined distance measurement Dj and the higher the significance measurement assigned to the test vector.

Based on the modified significance measurements D'1, . . . D'n, in a next process steps 14 one of the test vectors t1, . . . tn is then selected as motion vector or displacement vector v(x, y)_i for the image block $(x, y)_i$. For example, the test vector is selected for which the smallest modified distance measurement D' was determined. The determination of the modified distance measurement using the equation (3) is shown by way of example in FIG. 3. FIG. 3 shows a diagram in which the distance measurements determined for the individual test vectors t1, . . . , tn, the significance measurements S1, . . . , Sn assigned to the test vectors t1, . . . , tn, and the modified distance measurements D'1, . . . , D'n resulting therefrom are plotted. In the example shown in FIG. 3, the test vector t3, which has the smallest modified distance measurement D'3, was selected. Although in the example shown this test vector t3 does not have the smallest distance measurement, it has a high significance S3, which as a result leads to the smallest modified distance measurement D'.

Furthermore, the significance measurement is adapted to the motion vector $v(x, y)_i$ selected from the test vectors, or a new significance measurement is determined that is dependent on whether the selected motion vector meets at least one significance criterion. This adjustment of the significance measurement is shown in FIG. 2 as process step 15. The significance measurement determined for the selected motion vector in this process step 15 is used for a motion estimation or for a determination of a motion vector to image blocks temporally and/or spatially adjacent to the image block $(x, y)_i$, in which the motion vector $v(x, y)_i$ determined for the image block $(x, y)_i$ is selected as test vector. In the application of the selection plan explained by way of example based on FIG. 1, in which the zero vector as well as the motion vectors from two spatially adjacent and from two temporally and spatially adjacent image blocks are selected as test vectors, the motion vector $v(x, y)_i$ determined for the image block $(x, y)_i$ was selected as one of the test vectors in a motion estimate to the image blocks $(x+1, y)_i$ and $(x, y-1)_i$ within the same image F(i) and with a motion estimate to the image blocks $(x-1, y)_{i+1}$ and $(x-1, y)_{i+1}$ in the temporally following image F(i+1).

The adjustment of the significance measurement of the motion vector selected for the image block $(x, y)_i$ is carried out dependent on the distance measurements determined for the individual test vectors t1, . . . , tn. The selected motion vector meets a first significance criterion, for example, when the distance measurement thereof is greater than a predetermined first threshold value, thus when:

$$D > T1 \quad (4)$$

applies. D thereby denotes the distance measurement of the test vector selected as motion vector, and T1 denotes the first threshold value.

Alternatively, the selected motion vector can meet a significance criterion when the distance measurement of the selected vector is smaller than the threshold value, but at least one test vector is present, the distance measurement of which is greater than the threshold value. A scenario of this type with a selected test vector, the distance measurement of which is smaller than the threshold value and with at least one further test vector, the distance measurement of which is greater than the threshold value means that the motion estimate for a non-homogenous image area and the different distance measurements differ from one another significantly.

Another significance criterion for the selected motion vector is present, for example, when a difference between the greatest of the distance measurements determined for the test vectors and the smallest of the distance measurements determined for the test vectors is greater than a predetermined threshold value, thus when:

$$D_{max} - D_{min} > T2 \quad (5)$$

applies.

$D_{max}$ hereby denotes the greatest of the distance measurements determined for the test vectors, $D_{min}$ denotes the smallest of the distance measurements determined for the test vectors and T2 denotes the second threshold value. This second threshold value T2 is selected, for example, such that it is greater than a proportion determined by noise of the individual distance measurements. The presence of this significance criterion means the same as that at least one test vector is present that displays beyond a homogenous unmoving image area.

In general, it can be said that a significance criterion is met when at least one of the selected test vectors has a distance measurement that is significantly greater than the distance measurements of the other test vectors. If all of the test vectors have distance measurements that lie in the same range below a threshold value, this cannot be termed a significant test vector field.

If the selected motion vector meets at least one significance criterion, thus when the vector is significant, the significance measurement is set, for example, at a predetermined value $S_{max}$. This approach is explained based on the process steps 151, 152 in FIG. 4. Alternatively thereto, there is the possibility of increasing the significance measurement previously assigned to the test vector selected as motion vector by a predetermined value, when the selected motion vector is determined to be significant.

Figure 4:
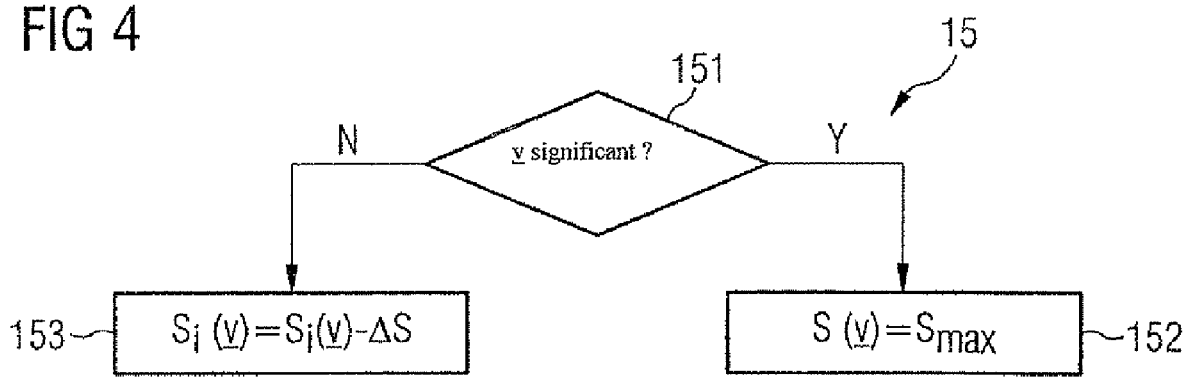
FIG. 4 shows one of the process steps explained based on FIG. 2 in detail based on a flow chart.

If the motion vector selected is not significant, this motion vector therefore does not meet any significance criteria, the new significance measurement for example is therefore determined in that the previous significance measurement is decremented by a predetermined $\Delta S$, which is shown in FIG. 4 based on the process step 153. However, the significance measurement is thereby decremented in a manner not shown in further detail at the most to zero, the smallest possible significance measurement that is assigned to a test vector is therefore zero.

"Previous significance measurement" hereby means the significance measurement that was previously assigned to the test vector selected as motion vector.

The significance measurement assigned to the selected motion vector in the manner described remains assigned to the motion vector when it is selected as a test vector for a motion estimate for a temporally and/or spatially adjacent image block. This significance measurement also is retained or remains assigned when the test vector is formed by modification of the selected motion vector. In this connection there is the possibility of reducing the significance measurement of a test vector that is formed by modification of a motion vector with respect to the significance measurement of the motion vector. As a result, this means a "penalization" of the test vector formed by modification of a motion vector. Alternatively thereto, there is the possibility in the determination of the modified distance measurements using the distance measurements and the significance measurements with such test vectors that are formed through modification of a motion vector of adding a "penalty value" to the determined distance measurement.

At the start of the method, when there are not yet any spatially and/or temporally adjacent image blocks to an image block, to which motion vectors have already been assigned, for example, firmly predetermined initialization vectors are selected as test vectors. As a significance measurement, for example, the value zero or another predetermined value is assigned to these initialization vectors. For the motion vector selected from these initialization vectors to the image block then, taking into account the presence of significance criteria for the selected motion vector, a significance measurement is determined.

Alternatively or additionally to the consideration of significance measurements in the determination of modified distance measurements from the distance measurements calculated for the individual test vectors, a length measurement assigned to at least one of the test vectors can be taken into consideration. This length measurement is, for example, firmly predetermined and serves to "reward" the test vector with the shortest vector length or a subgroup of test vectors that have the shortest vector lengths.

The determination of a modified distance measurement hereby provides determining the test vector or vectors with the shortest vector length or the shortest vector lengths and determining modified distance measurements to these determined vectors as follows:

$$D'=D-L \qquad (6).$$

D' hereby denotes the modified distance measurement of the shortest test vector or a test vector from the subgroup of the shortest test vectors, D denotes the distance measurement determined to the test vector and L denotes the firmly predetermined length measurement. The subgroup of the shortest test vectors, for example, comprises a predetermined number of test vectors, all of which are shorter than the test vector which does not belong to this subgroup.

Based on the modified distance measurements thus determined, subsequently one of the test vectors is selected as motion vector, wherein, for example, the test vector with the lowest modified distance measurement is selected. In this method those test vectors are "rewarded" that are shorter compared to other test vectors or only the shortest test vector is rewarded. In particular if a homogenous image area is present in which the distance measurements of all test vectors lie in an identical range, with this approach rather shorter test vectors, in particular the zero vector, are selected. The firmly predetermined length measurement or the length bonus are selected to be so small that with a homogeneous image environment the vector field is slowly "pushed back" in the direction of the zero vector, that on the other hand the convergence of the vector field is not negatively affected, however. With one embodiment it is provided thereby to use the length measurement only with every nth determination of a motion vector for a predetermined image block, wherein n is a whole number greater than or equal to 2.

Figure 5:
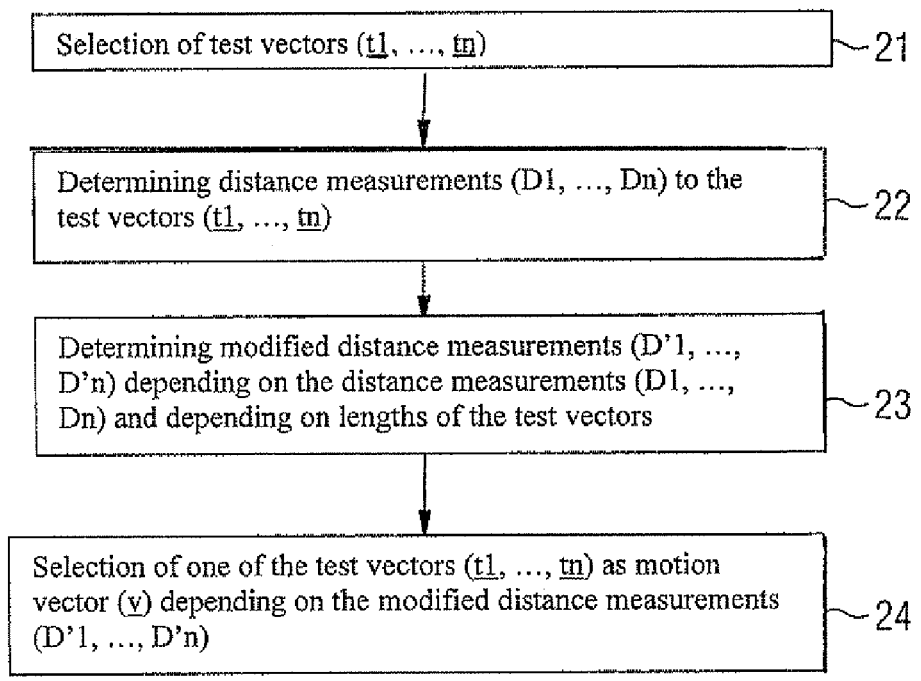
FIG. 5 illustrates another exemplary embodiment of a method according to the invention based on a flow chart.

These process steps of the alternative method, namely selection of test vectors, determining distance measurements to the test vectors, determining modified distance measurements depending on the distance measurements and depending on the length measurement, and the selection of one of the test vectors as motion vector depending on the modified distance measurements, are shown based on a flow chart with process steps 21 through 24 in FIG. 5. Of course, it is also possible with this method to "penalize" those test vectors compared to other vectors, which do not correspond directly to a motion vector of a temporally and/or spatially adjacent image block, but that are formed through modification of the motion vector of a spatially and/or temporally adjacent image block.

The invention claimed is:

1. A method for selecting a motion vector for a first image block of an image of an image sequence from a number of test vectors, wherein at least one of these test vectors is a motion vector of a further image block that is arranged temporally and/or spatially adjacent to the first image block, or a vector formed by modification of this motion vector, the method comprising the steps of:

determining a distance measurement for each test vector, determining a vector length of the test vectors and determining the test vector with the shortest vector length or a first subgroup of test vectors with the shortest vector lengths compared to the other test vectors, determining a modified distance measurement to the shortest test vector or to the test vectors of the subgroup depending on the distance measurement determined to the respective test vector and depending on a length measurement, comparing the modified distance measurement of the shortest motion vector or the modified distance measurements of the test vectors of the first subgroup to the distance measurements of the other test vectors and selecting one of the test vectors depending on this comparison;

wherein a significance measurement is respectively assigned to the test vectors further comprising the steps of:

determining the modified distance measurement of the shortest test vector or the first subgroup depending on the significance measurement assigned to this test vector or on the significance measurements assigned to these test vectors and determining modified distance measurements for the other test vectors, which are dependent on the significance measurements respectively assigned to these test vectors;

selecting one of the test vectors as a motion vector depending on the modified distance measurements;

determining a new significance measurement of the test vector selected as motion vector depending on whether the selected motion vector meets at least one significance criterion, and assigning this new significance measurement as significance measurement to the motion vector for the selection of a motion vector for a third image block, wherein the motion vector of the first image block or a vector formed by modification of this motion vector is selected as test vector.

2. The method according to claim 1, wherein the length measurement is firmly predetermined.

3. The method according to claim 1, wherein a modified length measurement corresponds to a difference between the distance measurement and the length measurement.

4. The method according to claim 1, wherein the length measurement is taken into account only with every nth, where n2, determination of a motion vector for the first image block.

5. The method according to claim 1, wherein the selected test vector meets a first significance criterion when its distance measurement is greater than a predetermined first threshold value.

6. The method according to claim 1 wherein the selected motion vector meets a second significance criterion when its distance measurement is smaller than the first threshold value, but the distance measurement of at least one of the other test vectors is greater than the first threshold value.

7. The method according to claim 1, wherein the selected test vector meets a second significance criterion when a difference between a largest distance measurement determined for all of the test vectors and the distance measurement determined for the selected motion vector is greater than a second threshold value.

8. The method according to claim 1,
wherein for determining the new significance measurement it is determined whether the test vector selected as motion vector meets at least one significance criterion,
wherein the new significance measurement is set at a predetermined value when the selected test vector meets at least one significance criterion, and
wherein the new significance measurement is formed by reducing the significance measurement hitherto assigned to the selected test vector when the selected test vector does not meet a significance criterion.

9. The method according to claim 1, wherein the test vectors include the zero vector.

10. The method according to claim 1, wherein at least one of the test vectors is formed from the motion vector of the further image block by addition of an updating vector.

11. The method according to claim 1, wherein the modified distance measurement is determined by subtraction of the significance measurement from the distance measurement.

12. The method according to claim 1, wherein the modified distance measurement of a test vector is additionally dependent on whether the test vector is a motion vector of a temporally and/or spatially adjacent image block or whether the test vector is formed through modification of a temporally and/or spatially adjacent image block.

* * * * *